US012001654B2

(12) United States Patent
Sun

(10) Patent No.: US 12,001,654 B2
(45) Date of Patent: Jun. 4, 2024

(54) IMAGE STORAGE METHOD AND TERMINAL DEVICE

(71) Applicant: VIVO MOBILE COMMUNICATION CO., LTD., Guangdong (CN)

(72) Inventor: Jingxuan Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 174 days.

(21) Appl. No.: 17/384,115

(22) Filed: Jul. 23, 2021

(65) Prior Publication Data

US 2021/0349589 A1    Nov. 11, 2021

Related U.S. Application Data

(63) Continuation of application No. PCT/CN2020/071685, filed on Jan. 13, 2020.

(30) Foreign Application Priority Data

Jan. 25, 2019   (CN) .......................... 201910072671.1

(51) Int. Cl.
G06F 3/0484     (2022.01)
G06F 3/0482     (2013.01)
G06F 3/04883    (2022.01)
G06F 16/51      (2019.01)

(52) U.S. Cl.
CPC .......... *G06F 3/0484* (2013.01); *G06F 3/0482* (2013.01); *G06F 3/04883* (2013.01); *G06F 16/51* (2019.01)

(58) Field of Classification Search
CPC .... G06F 3/0484; G06F 16/51; G06F 3/04883; G06F 3/0482
See application file for complete search history.

(56) References Cited

U.S. PATENT DOCUMENTS 9,088,719 B2      7/2015  Yi et al.
9,826,143 B2     11/2017  Kwon et al.
2014/0071323 A1*  3/2014  Yi .......................... G06F 3/0486
                                                      348/333.01
2015/0026616 A1   1/2015  Litan Sever et al.
(Continued)

FOREIGN PATENT DOCUMENTS

CN    103685724 A    3/2014
CN    104125508 A   10/2014
(Continued)

OTHER PUBLICATIONS

Supplementary European Search Report regarding Patent Application No. 20745642.7-1203/3916532; PCT/CN2020/071685, dated Mar. 9, 2022.
(Continued)

Primary Examiner — Andrea C Leggett
(74) Attorney, Agent, or Firm — Harness, Dickey & Pierce, P.L.C.

(57) ABSTRACT

An image storage method includes: receiving a first input; generating a screenshot image and displaying a thumbnail of the screenshot image in response to the first input; receiving a second input for the thumbnail; determining a target storage location in response to the second input; and storing the screenshot image to the target storage location.

18 Claims, 12 Drawing Sheets

(56) References Cited

U.S. PATENT DOCUMENTS

| | | | |
|---|---|---|---|
| 2015/0180998 A1* | 6/2015 | Cho | G06F 3/0482 |
| | | | 715/745 |
| 2017/0038922 A1* | 2/2017 | Eim | H04W 4/50 |
| 2017/0054861 A1* | 2/2017 | Dejoras | H04N 1/00429 |
| 2017/0212658 A1* | 7/2017 | Shimizu | G06T 1/60 |
| 2018/0341397 A1* | 11/2018 | Lu | G06F 16/00 |
| 2019/0147026 A1* | 5/2019 | Jon | G06F 40/171 |
| | | | 715/230 |

FOREIGN PATENT DOCUMENTS

| | | | |
|---|---|---|---|
| CN | 105144071 A | 12/2015 | |
| CN | 106155517 A | 11/2016 | |
| CN | 106202194 A | 12/2016 | |
| CN | 106610770 A | 5/2017 | |
| CN | 107229637 A | 10/2017 | |
| CN | 107678644 A | 2/2018 | |
| CN | 107844244 A | 3/2018 | |
| CN | 108055383 A | 5/2018 | |
| CN | 108762612 A | 11/2018 | |
| CN | 109814786 A | 5/2019 | |
| EP | 2972739 B1 | 1/2016 | |
| EP | 3301557 A1 | 4/2018 | |
| KR | 20140013770 A | 2/2014 | |
| KR | 20150093023 A | 8/2015 | |

OTHER PUBLICATIONS

International Search Report and Written Opinion of the International Searching Authority regarding International Patent Application No. PCT/CN2020/071685, dated Apr. 17, 2020. Translation provided by Bohui Intellectual Property.

First Office Action regarding Chinese Patent Application No. 201910072671.1, dated May 7, 2020. Translation provided by Bohui Intellectual Property.

Notification to Grant Patent Right for Invention regarding Chinese Patent Application No. 201910072671.1, dated Oct. 29, 2020. Translation provided by Bohui Intellectual Property.

* cited by examiner

IMAGE STORAGE METHOD AND TERMINAL DEVICE

CROSS-REFERENCE TO RELATED APPLICATIONS

This application is a Bypass Continuation Application of PCT/CN2020/071685 filed on Jan. 13, 2020, which claims priority to Chinese Patent Application No. 201910072671.1 filed on Jan. 25, 2019, which are incorporated herein by reference in their entirety.

TECHNICAL FIELD

The disclosure relates to the field of a communication technology and in particular, relates to an image storage method and a terminal device.

BACKGROUND

With continuous development of a terminal device, a demand of a user on a screenshot function of the terminal device is more and more frequent. While the number of screenshot of the user is gradually increased, the arrangement of images in a screenshot photo album is messy. While the user wants to search saved information through the screenshot, the information is difficult to search due to messy image arrangement, even abandoning the search.

SUMMARY

Embodiments of the present disclosure provide an image storage method and a terminal device.

According to a first aspect, the embodiments of the present disclosure provide an image storage method, including:
 receiving a first input;
 generating a screenshot image and displaying a thumbnail of the screenshot image in response to the first input;
 receiving a second input for the thumbnail;
 determining a target storage location in response to the second input; and
 storing the screenshot image to the target storage location.

According to a second aspect, the embodiments of the present disclosure provide a terminal device, including:
 a first receiving module, configured to receive a first input;
 a first processing module, configure to generate a screenshot image and display a thumbnail of the screenshot image in response to the first input;
 a second receiving module, configured to receive a second input for the thumbnail;
 a determining module, configured to determine a target storage location in response to the second input; and
 a storage module, configured to store the screenshot image to the target storage location.

According to a third aspect, the embodiments of the present invention further provide a terminal device, including a processor, a memory, a computer program that is stored in the memory and executable on the processor, and when the computer program is executed by the processor, the steps of the above image storage method are implemented.

According to a fourth aspect, the embodiments of the present disclosure provide a non-transitory computer-readable storage medium, where the non-transitory computer-readable storage medium stores a computer program, and when the computer program is executed by a processor, the steps of the above image storage method are implemented.

BRIEF DESCRIPTION OF DRAWINGS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

DETAILED DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Figure 1:
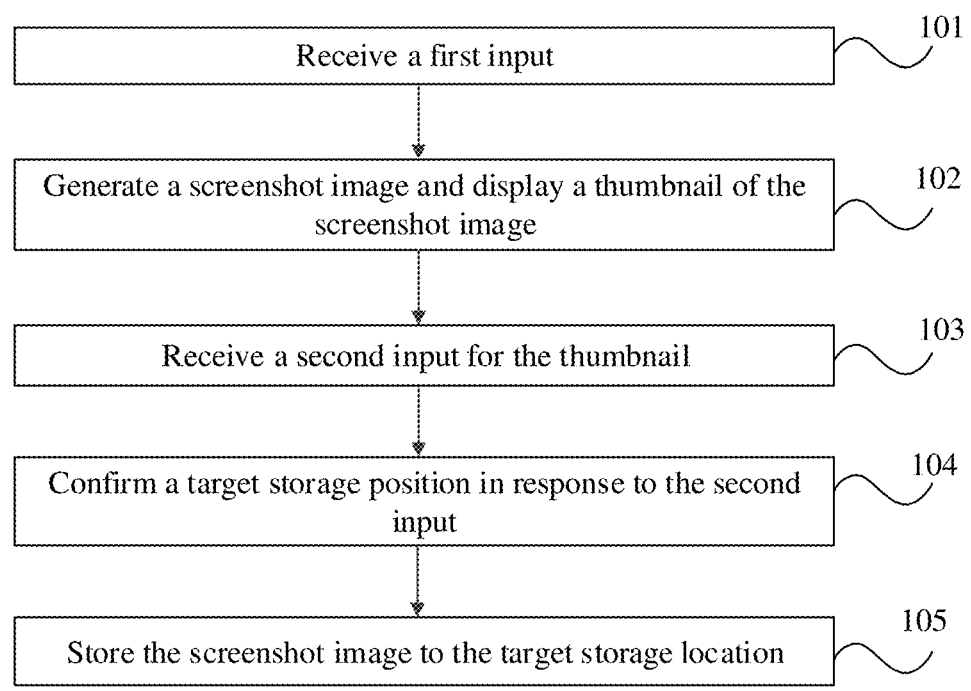
FIG. 1 is a schematic diagram of an image storage method according to an embodiment of the present disclosure.

The embodiments of the present disclosure provide an image storage method. As shown in FIG. 1, the image storage method includes the following steps:

Step 101: Receive a first input.

The image storage method provided by the embodiments of the present disclosure is applied to a terminal device, the terminal device receives a first input performed by a user on a display screen firstly, and the first input herein may be a screenshot operation. Execute Step 102 after receiving the first input performed by the user.

Step 102: Generate a screenshot image and display a thumbnail of the screenshot image in response to the first input.

After receiving the first input performed by the user for the display screen, a screenshot image corresponding to the first input may be generated based on the first input performed by the user. Where the thumbnail corresponding to the screenshot image is displayed on a screenshot interface corresponding to the screenshot image while the screenshot image is generated based on the first input performed by the user.

After generating the screenshot image and displaying the thumbnail of the screenshot image, a sorting and storing function of the screenshot image needs to be checked whether the function is turned on, and Step 103 may be executed in condition that the function is turned on. Where the terminal device can create different types of screenshot folders, the various types of created screenshot folders can be regarded as sub photo albums, and can generate under a total photo album of a screenshot of the terminal device automatically. In condition that the arranging and storing function is turned on, the screenshot image may be stored through the various types of created screenshot folders.

Where the user can create different types of screenshot folders on a setting interface based on his/her own needs, and the screenshot folders created by the user and the screenshot folders created by the terminal device belongs to the sub photo albums, the screenshot folders created by the user can generate under the total photo album of the screenshot of the terminal device automatically. In condition that the sorting and storing function is turned on, various types of screenshot folders created by the terminal device or the user are available.

Step 103: Receive a second input for the thumbnail.

The second input performed by the user for the thumbnail can be received in condition of generating the screenshot image, displaying the thumbnail corresponding to the screenshot image on the screenshot interface and confirming that the sorting and storing function is turned on. Step 104 may be executed after receiving the second input performed by the user for the thumbnail of the screenshot image.

Step 104: Determine a target storage location in response to the second input.

After receiving the second input performed by the user for the thumbnail of the screenshot image, the target storage location can be determined based on the second input performed by the user, where the determined target storage location is different due to different second inputs.

Step 105: Store the screenshot image to the target storage location.

After determining the target storage location based on the second input performed by the user, the screenshot image is stored according to the determined target storage location, to ensure that the screenshot image can be sorted and stored orderly, and the efficiency of arranging the screenshot image is improved.

The technical solution of the present disclosure, generates the screenshot image and displays the thumbnail of the screenshot image in response to the first input performed by the user; receives the second input performed by the user for the thumbnail and determines the target storage location; and stores the screenshot image based on the determined target storage position. A function of sorting and storing the screenshot image quickly may be achieved, to ensure that the screenshot image may be stored orderly based on the operation performed by the user. The efficiency of arranging the screenshot image is improved, and the cost of arranging is saved.

In this embodiment of the present disclosure, the second input is a first sliding operation in a first direction; in response to the second input, a step of determining the target storage location, including:

displaying at least one screenshot folder or a screenshot folder icon in response to the first sliding operation; receiving a first touch operation performed by the user for a first screenshot folder or a first screenshot folder icon; and determining the first screenshot folder as the target storage location of the screenshot image in response to the first touch operation.

After receiving the first sliding operation performed by the user for the thumbnail displayed on the screenshot interface in the first direction, a first list is generated in a first region of the screenshot interface based on the received first sliding operation, where the first list includes at least one screenshot folder or at least one screenshot folder icon, and the screenshot folder herein can be created by the terminal device and/or the user.

It should be noted that the first direction is not limited in detail herein, the first region of the screenshot interface may be a left region, a right region or a blank region of a screen; certainly, the first region may be other regions, and is not further limited.

After generating the first list in the first region, the first touch operation performed by the user for the first screenshot folder in the first list can be received. At this time, the first screenshot folder may be highlighted or weakened to distinguish from other folders. The first screenshot folder is determined as the target storage location of the screenshot image based on the first touch operation performed by the user; or the first touch operation performed by the user for the first screenshot folder icon in the first list can be received, at this time, the first screenshot folder icon may be highlighted or weakened to distinguish from other folder icons. The first screenshot folder corresponding to the first screenshot folder icon is determined as the target storage location of the screenshot image based on the first touch operation performed by the user.

Figure 2A:
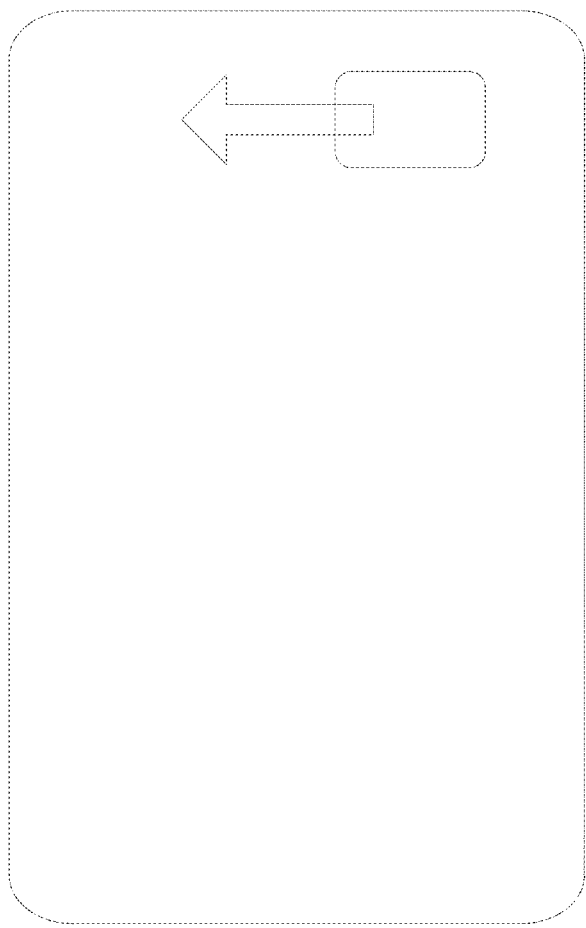
FIG. 2A is a schematic diagram of receiving a first sliding operation performed by a user on a thumbnail according to an embodiment of the present disclosure.
Figure 2B:
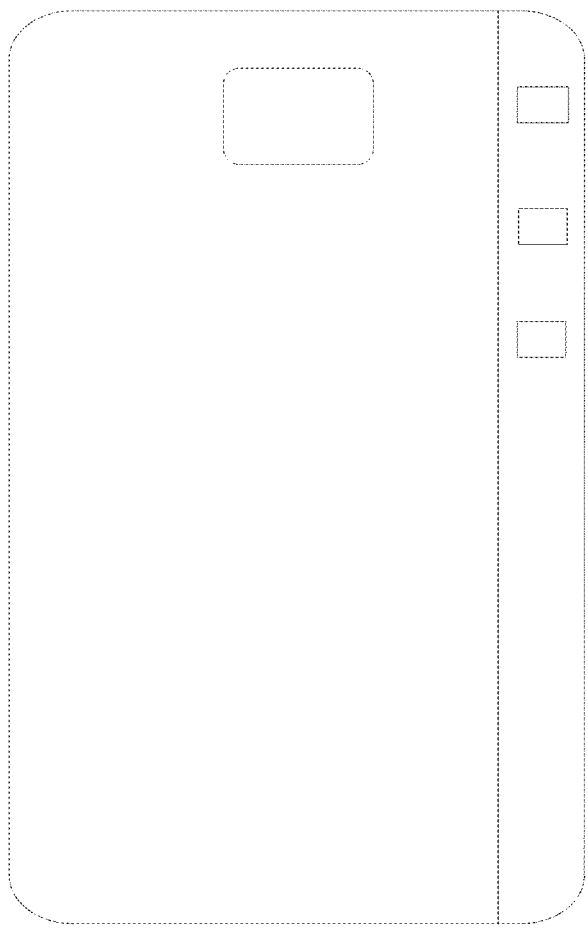
FIG. 2B is a schematic diagram of displaying a first list in a first region of a screenshot interface according to an embodiment of the present disclosure.

The following states the process through an embodiment, as shown in FIG. 2A to FIG. 2B. After receiving a first input performed by a user for a display screen, a screenshot image is generated, and a thumbnail of the screenshot image is displayed at the upper right of a screenshot interface. A first sliding operation performed by the user for the thumbnail in a left side is received, and a first list is generated in a right region of a screen based on the first sliding operation performed by the user, where three screenshot folder icons are displayed in the first list, and after the user selects one of the screenshot folder icons through a first touch operation, a screenshot folder corresponding to the screenshot folder icon selected by the user is determined as a target storage location of the screenshot image.

In the above implementation process, the first list, including at least one screenshot folder or at least one screenshot folder icon, is generated through the first sliding operation performed by the user. Determine the target storage location according to the user's selection operation in the first list, quick and effective arranging of the screenshot image may be achieved based on the demands of the user, to ensure that the screenshot image can be sorted and stored orderly, the efficiency of arranging the screenshot image is improved, and the cost of arranging is saved.

In this embodiment of the present disclosure, the second input is a second sliding operation in a second direction. A step of determining the target storage location in response to the second input includes: displaying at least one screenshot folder or screenshot folder icon during a process of receiving the second sliding operation; and determining a second screenshot folder as the target storage location of the screenshot image while the second sliding operation stops on the second screenshot folder or a second screenshot folder icon.

The terminal device firstly receives the second sliding operation performed by the user for the thumbnail displayed on the screenshot interface in the second direction, and during an executing process of the second sliding operation, a second list is generated in a second region of the screenshot interface, where the generated second list may include at least one screenshot folder or at least one screenshot folder icon. Each screenshot folder herein stores certain type of screenshot image, image types stored in each screenshot folder are different, therefore icons corresponding to each screenshot folder are also different. For example, the screenshot folder 1 stores scenery images, and the screenshot folder 2 stores character images.

While the second list is generated and the second sliding operation stops in the second list, a stopping position of the second sliding operation needs to be acquired, and the second screenshot folder corresponding to the stopping position is determined as the target storage location of the screenshot image, or the second screenshot folder corresponding to the second screenshot folder icon at the stopping position is determined as the target storage location of the screenshot image.

Where the second screenshot folder or the second screenshot folder icon may be in a selected state, the selected state herein may be displayed in a manner in which the other folders or icons can be distinguished, and for example, compared with other folders or icons, the selected state is highlighted. At this time, the second screenshot folder or the second screenshot folder icon may be controlled to be highlighted, or displayed in other highlighted display manners.

It should be noted that the second direction is an extension direction of the thumbnail to the second list, and if the second sliding operation does not stop in the second list, the target storage location cannot be determined based on the second sliding operation at this time.

Figure 3A:
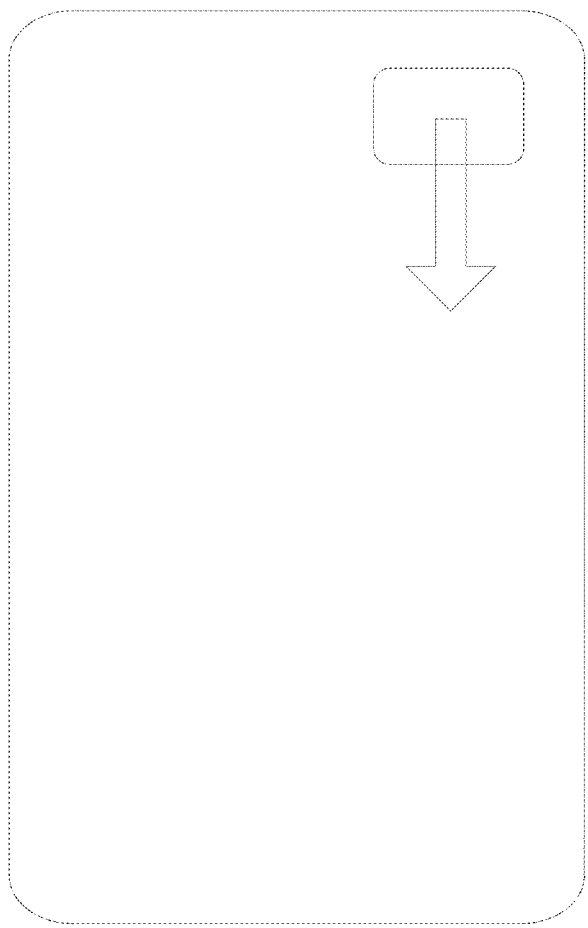
FIG. 3A is a schematic diagram of receiving a second sliding operation performed by a user on a thumbnail according to an embodiment of the present disclosure.
Figure 3B:
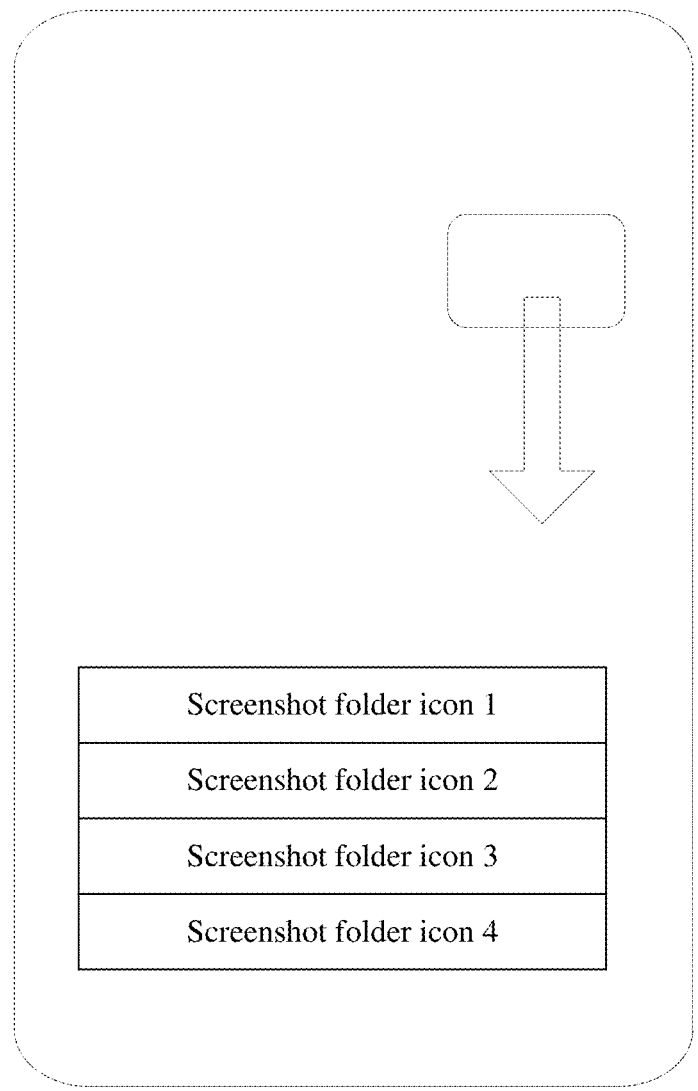
FIG. 3B is a schematic diagram of displaying a second list in a second region of a screenshot interface according to an embodiment of the present disclosure.
Figure 3C:
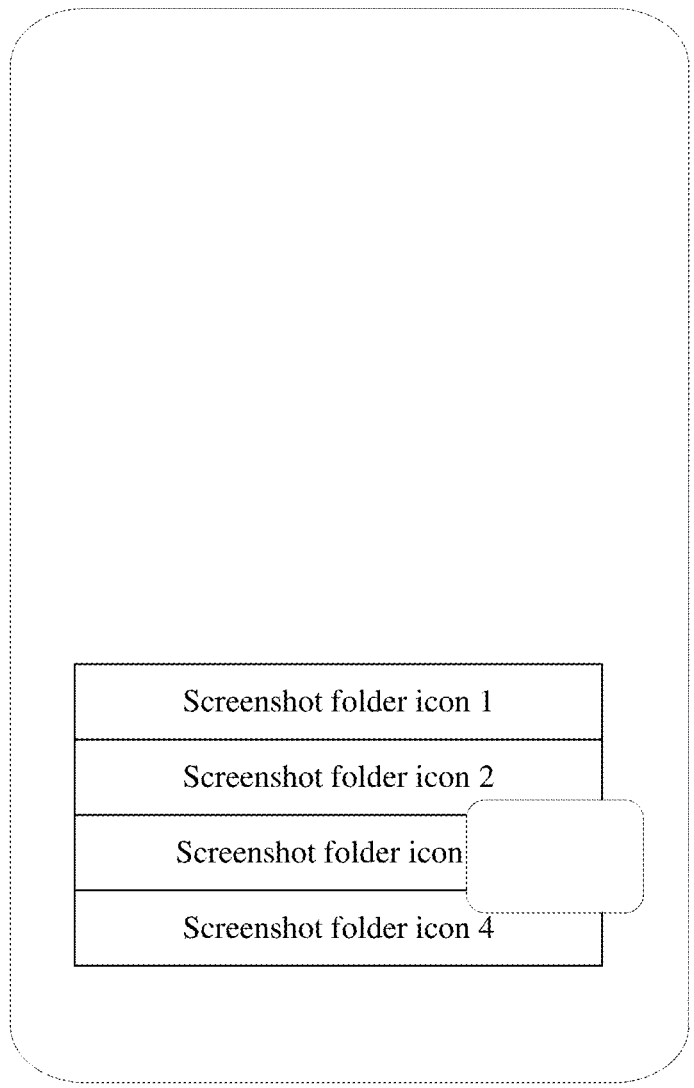
FIG. 3C is a schematic diagram of selecting a second screenshot folder through a second sliding operation according to an embodiment of the present disclosure.

The following states the process through an embodiment, as shown in FIG. 3A to FIG. 3C. A thumbnail of a screenshot image is generated at the upper right of a screenshot interface. And a second sliding operation, for the thumbnail and moving the thumbnail down, performed by a user is received. During an executing process of the second sliding operation, a second list automatically pops up in a second region below the thumbnail, where the second list includes four screenshot folder icons, which are screenshot folder icon 1, screenshot folder icon 2, screenshot folder icon 3 and screenshot folder icon 4 respectively. A second screenshot folder icon is determined in the above four screenshot folder icons based on a stopping position of the second sliding operation (screenshot folder icon 3), at this time, the screenshot folder iron 3 is the second screenshot folder icon, and the screenshot folder icon 3 may be displayed differently from other icons. For example, the screenshot folder icon 3 is displayed in a highlighted manner (not shown in FIG. 3C). And then a second screenshot folder corresponding to the second screenshot folder icon is determined as a target storage location of the screenshot image.

In the above implementation process, the second list including at least one screenshot folder or screenshot folder icon is generated through the second sliding operation performed by the user. While the second sliding operation stops in the second list, the second screenshot folder or the second screenshot folder icon corresponding to the stopping position of the second sliding operation in a selected state is acquired. The second screenshot folder is determined as a storage location of the screenshot image, quick and effective sorting of the screenshot image may be achieved based on the demands of the user, to ensure that the screenshot image can be sorted and stored orderly, and the efficiency of arranging the screenshot image is improved.

In this embodiment of the present disclosure, the second input is a third sliding operation in a third direction. A step of determining the target storage location in response to the second input includes: displaying at least one screenshot type icon during a process of receiving the third sliding operation; and determining a third screenshot folder corresponding to the first screenshot type icon and determining the third screenshot folder as the target storage location of the screenshot image while the third sliding operation stops on a first screenshot type icon.

The terminal device firstly receives the third sliding operation performed by the user for the thumbnail displayed on the screenshot interface in the third direction, and during an executing process of the third sliding operation, a third list is generated in a third region of the screenshot interface, where the generated third list may include at least one screenshot type icon. Where the screenshot type icon is not equal to the screenshot folder icon, the screenshot type icon is the icon that is generated for various types of screenshot images, and each type of screenshot image may correspond to one screenshot type icon. For example, a class of screenshot images may be determined for a certain application program, and then a class of screenshot type icons can be determined, then corresponding screenshot type icons can be generated according to the different types of application programs. The class of screenshot images can be also determined for each application program, a desktop corresponds to the class of screenshot images, and then the screenshot type icon corresponding to the screenshot image is determined; and certainly, there may be other sorting manners for the screenshot image, and sorting manners are not illustrated herein.

While the third list is generated and the third sliding operation stops in the third list, a stopping position of the third sliding operation needs to be acquired, and a first screenshot type icon corresponding to the stopping position acquired based on the stopping position, a third screenshot folder corresponding to the first screenshot type icon is determined, and the third screenshot folder is determined as the target storage location of the screenshot image.

Where the first screenshot type icon may be in a selected state, the selected state herein may be displayed in a manner in which other type icons can be distinguished, and for example, compared with other screenshot type icons, the selected state is highlighted. The first screenshot type icon may be controlled to be highlighted, or displayed in other highlighted display manners.

It should be noted that the third direction is a direction from the thumbnail to the third list, and if the third sliding operation does not stop in the third list, the target storage location cannot be determined based on the third sliding operation at this time.

Figure 4A:
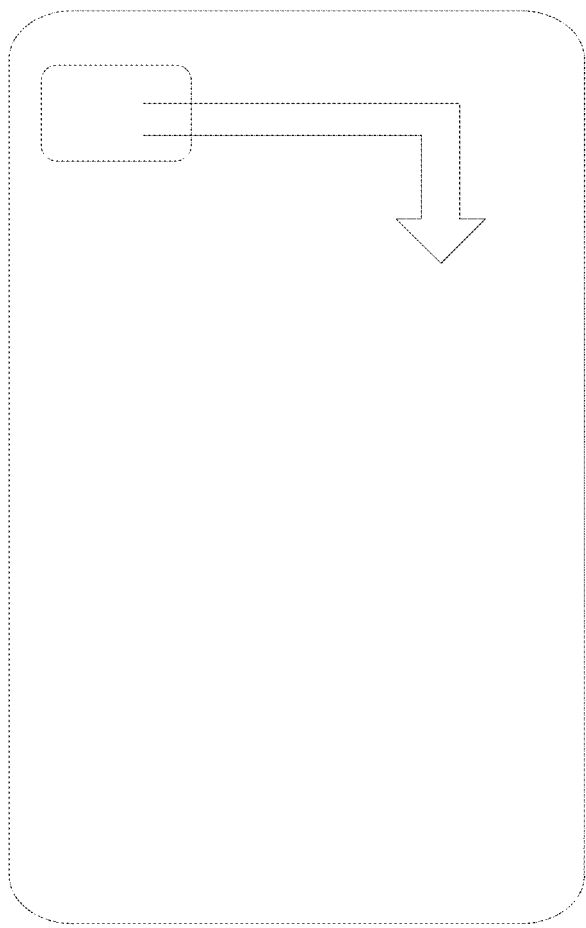
FIG. 4A is a schematic diagram of receiving a third sliding operation performed by a user on a thumbnail according to an embodiment of the present disclosure.
Figure 4B:
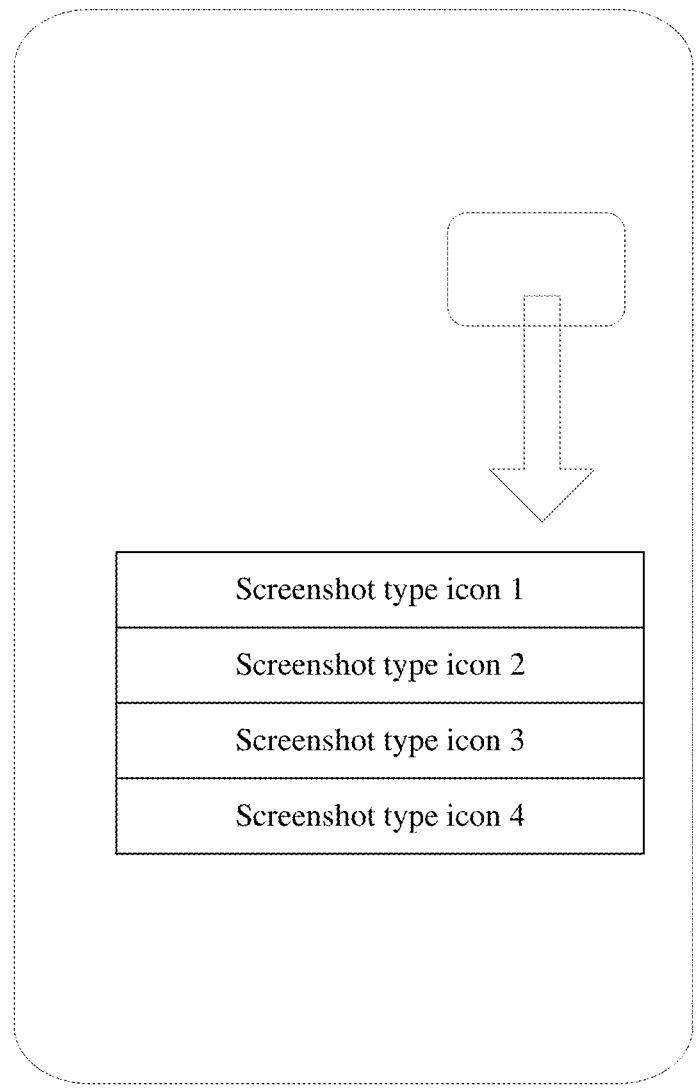
FIG. 4B is a schematic diagram of displaying a third list in a third region of a screenshot interface according to an embodiment of the present disclosure.
Figure 4C:
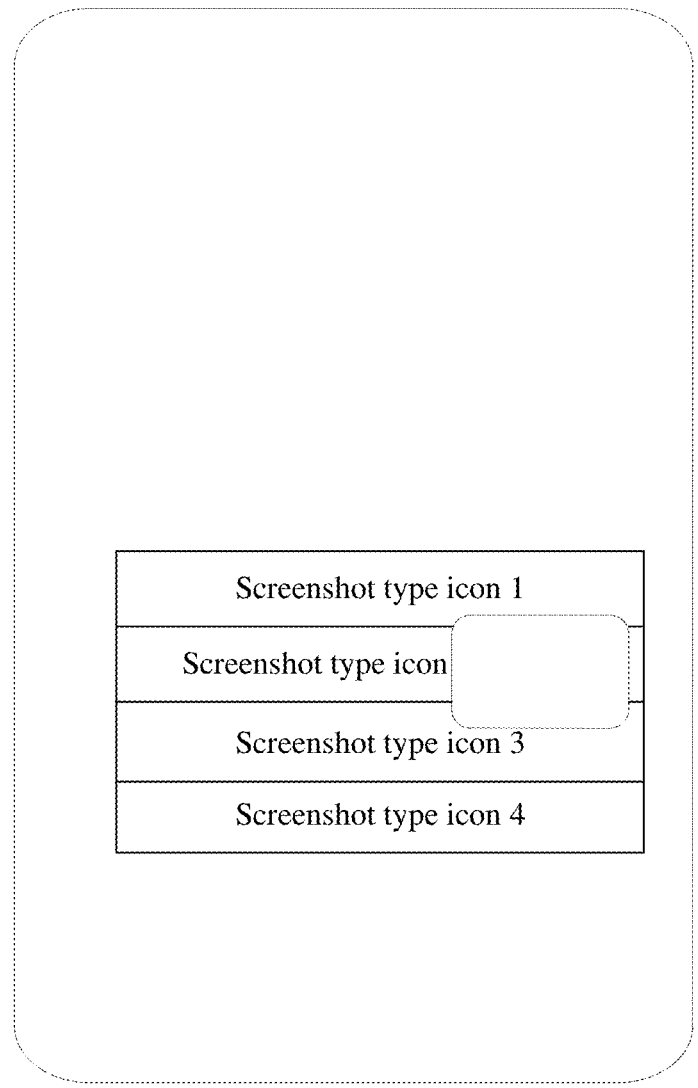
FIG. 4C is a schematic diagram of selecting a third screenshot folder through a third sliding operation according to an embodiment of the present disclosure.

The following states the process through an embodiment, as shown in FIG. 4A to FIG. 4C. A thumbnail of a screenshot image is generated at the upper left of a screenshot interface. And a third sliding operation, moving the thumbnail to the right and down, performed by a user is received. During an executing process of the third sliding operation, a third list pops up in a third region automatically, where the third list includes four screenshot type icons, which are screenshot type icon 1, screenshot type icon 2, screenshot type icon 3 and screenshot type icon 4 respectively. A first screenshot type icon is determined in the above four screenshot type icons based on a stopping position of the third sliding operation (screenshot type icon 2), at this time, the screenshot type iron 2 is the first screenshot type icon, and the screenshot type icon 2 may be displayed in distinguishing other icons. And then a third screenshot folder corresponding to the first screenshot type icon is determined as a target storage location of the screenshot image.

In the above implementation process, the third list including at least one screenshot type icon is generated through the third sliding operation performed by the user. While the third sliding operation stops in the third list, the first screenshot type icon corresponding to the stopping position of the third sliding operation in a selected state is acquired. The third screenshot folder corresponding to the first screenshot type icon is determined as a storage location of the screenshot image, quick and effective sorting of the screenshot image may be achieved based on the demands of the user, to ensure that the screenshot image can be sorted and stored orderly, and the efficiency of arranging the screenshot image is improved.

It should be noted that the user may execute the first sliding operation and the second sliding operation at the same time, or execute the first sliding operation and the third sliding operation simultaneously, or execute the second sliding operation and the third sliding operation simultaneously, or execute the first sliding operation, the second sliding operation and the third sliding operation simultaneously.

For a case that the user executes the first sliding operation and the second sliding operation simultaneously, the terminal device pops up the first list and the second list based on an operation performed by the user, and the user selects which list for performing a subsequent operation. If the user executes the operation in the first list and the second list, two screenshot folders may be determined based on the operation performed by the user, and the two screenshot folders are determined as target storage locations of the screenshot image.

For example, receiving the first sliding operation performed by the user for the thumbnail in the first direction, and the second sliding operation in the second direction; in response to the first sliding operation, generating the first list including at least one screenshot holder or screenshot folder icon in the first region of the screenshot interface, and generating the second list in the second region of the screenshot interface during a process of executing the second sliding operation, where the second list includes at least one screenshot folder or screenshot folder icon. Where the screenshot folders included in the first list and the second list may be the same or different, and the corresponding screenshot folder icons included in the first list and the second list may be the same or different. After the first list and the second list are generated, the user may select to perform a selection in the first list or continue the second sliding operation and perform the selection in the second list.

If the user executes the selection in the first list, the first touch operation performed by the user for the first screenshot folder or the first screenshot folder icon in the first list is received; and in response to the first touch operation, the first screenshot folder is determined as the target storage location of the screenshot image. If the user continues the second sliding operation and performs the selection in the second list, the second screenshot folder or the second screenshot folder icon corresponding to the stopping position of the second sliding operation in the selected state is acquired while the second sliding operation stops in the second list, and then the second screenshot folder is determined as the target storage location of the screenshot image. If the user executes the selection in the first list and the second list, the first touch operation performed by the user for the first screenshot folder or the first screenshot folder icon in the first list is received. While the second sliding operation stops in the second list, the second screenshot folder or the second screenshot folder icon corresponding to the stopping position of the second sliding operation in the selected state is acquired, and then the first screenshot folder and the second screenshot folder are determined as the target storage locations of the screenshot image.

For a case that the user executes the first sliding operation and the third sliding operation simultaneously, the terminal device pops up the first list and the third list based on an operation performed by the user, and the user selects which list for performing a subsequent operation. If the user executes the operation in the first list and the third list, two screenshot folders may be determined based on the operation performed by the user, and the two screenshot folders are determined as the target storage locations of the screenshot image.

A case that the user executes the second sliding operation and the third sliding operation simultaneously, and a case that the user executes the first sliding operation, the second sliding operation and the third sliding operation simultaneously are not stated herein.

In this embodiment of the present disclosure, in condition that an automatic storage function is tuned on, after generating the screenshot image and displaying the thumbnail of the screenshot image, the image storage method further includes the steps of: identifying a target image type corresponding to the thumbnail; searching a fourth screenshot folder corresponding to the target image type based on a pre-set correspondence between an image type and the screenshot folder; and storing the screenshot image in the fourth screenshot folder, and storing the screenshot image at the target storage location in response to the second input.

Before the terminal device generates the screenshot image, the user can turn on or turn off the automatic storage function on a setting interface. After the terminal device generates the screenshot image and displays the thumbnail, the automatic storage function may be detected whether the function is turned on. In condition that the automatic storage function is turned on, the image type to which the thumbnail belongs may be identified, and the identified image type is determined as the target image type. After the target image type is determined, a fourth screenshot folder corresponding to the target image type is searched based on the pre-set correspondence between the image type and the screenshot folder, and then the screenshot image is stored to the fourth screenshot folder, then the screenshot image is stored to the target storage location based on the second input performed by the user. While the automatic storage function is tuned on, the automatic storage of the screenshot image ensured without the operation performed by the user may be achieved, and meanwhile the screenshot image is stored to the target storage location based on the operation performed by the user, and a user experience is further ensured.

It should be noted that the image type needs to be divided in advance for this case, a corresponding screenshot folder is determined for each image type, and a correspondence between the image type and the screenshot folder is established, where while performing the image type division and determining the corresponding screenshot folder, the correspondence may be set through the terminal device in advance, or set by the user.

In this embodiment of the present disclosure, the method of generating the screenshot image and displaying the thumbnail of the screenshot image, including:

displaying a sharing icon while generating the screenshot image and displaying the thumbnail of the screenshot image; the method further includes the steps of: receiving a third input performed by the user for the sharing icon, and sharing the screenshot image to a target object in response to the third input.

Figure 5:
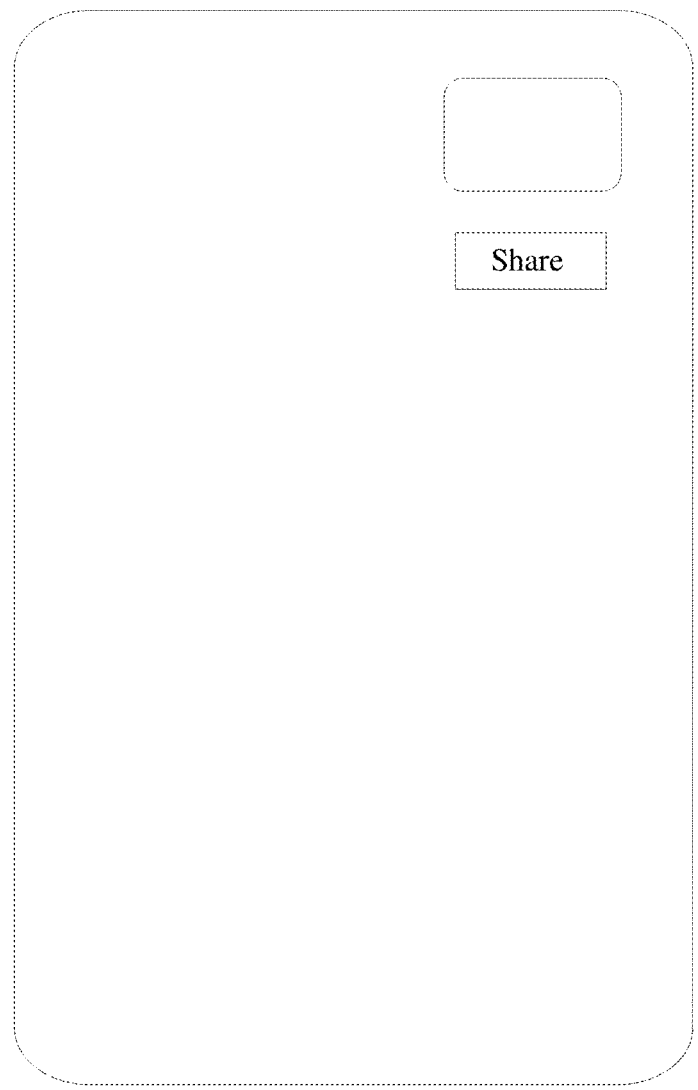
FIG. 5 is a schematic diagram of displaying a thumbnail and sharing an icon on the screenshot interface according to an embodiment of the present disclosure.

While generating the screenshot image and displaying the thumbnail of the screenshot image at the screenshot interface, the sharing icon may be displayed at a specific position of the screenshot interface, as shown in FIG. 5, the sharing icon is displayed below the thumbnail. After displaying the sharing icon, the generated screenshot image is shared to the target object based on the third input performed by the user for the sharing icon, or an object to be shared is selected by the user. After completing the sharing, the corresponding storage location of the acquired screenshot image is continuously determined, and the screenshot image is stored.

In the above implementation process, the screenshot image is shared through generating the sharing icon while displaying the thumbnail and based on the operation performed by the user for the sharing icon, and the screenshot image is continuously stored after completing the sharing. When achieving the sharing, the ordered sorting and storage of the screenshot image may be ensured, and the efficiency of arranging the screenshot image is improved.

In conclusion, the image storage method provided by the embodiments of the present disclosure generates the screenshot image and displays the thumbnail of the screenshot image in response to the first input performed by the user; receives the second input performed by the user for the thumbnail and determines the target storage location; and stores the screenshot image based on the determined target storage location. The quick sorting and storing function for the screenshot image may be achieved, to ensure that the screenshot image is orderly stored based on the operation performed by the user, the efficiency of arranging the screenshot image is improved, the cost of arranging is saved, and meanwhile, a variety of storage methods may be provided to the screenshot image.

Optionally, the automatic storage of the screenshot image may be achieved through turning on the automatic storage function, the sharing of the screenshot image may be achieved through generating the sharing icon while displaying the thumbnail, and the using experience of the user is improved.

Figure 6:
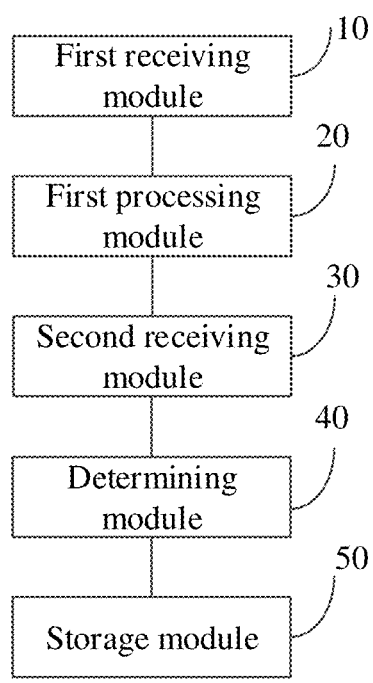
FIG. 6 is a schematic diagram of a terminal device according to an embodiment of the present disclosure.

The embodiments of the present disclosure further provide a terminal device, as shown in FIG. 6, the terminal device includes:

a first receiving module 10, configured to receive a first input;

a first processing module 20, configured to generate a screenshot image and display a thumbnail of the screenshot image in response to the first input;

a second receiving module 30, configured to receive a second input for the thumbnail;

a determining module 40, configured to determine a target storage location in response to the second input;

a storage module 50, configured to store the screenshot image to the target storage location.

Where the second input is a first sliding operation in a first direction; and the determining module includes:

a first display submodule, configured to display at least one screenshot folder or screenshot folder icon in response to the first sliding operation;

a receiving submodule, configured to receive a first touch operation performed by a user for a first screenshot folder or a first screenshot folder icon;

a first determining submodule, configured to determine the first screenshot folder as the target storage location of the screenshot image in response to the first touch operation.

Where the second input is a second sliding operation in a second direction, and the determining module includes:

a second display submodule, configured to display at least one screenshot folder or screenshot folder icon during a process of receiving the second sliding operation;

a second determining submodule, configured to determine a second screenshot folder as the target storage location of the screenshot image while the second sliding operation stops at the second screenshot folder or a second screenshot folder icon.

Where the second input is a third sliding operation in a third direction; and the determining module includes:

a third display submodule, configured to display at least one screenshot type icon during a process of receiving the third sliding operation;

a third determining submodule, configured to determine a third screenshot folder corresponding to a first screenshot type icon and determine the third screenshot folder as the target storage location of the screenshot image while the third sliding operation stops at the first screenshot type icon.

Where the terminal device further includes:

an identifying module, configured to identify a target image type corresponding to the thumbnail after the first processing module generates the screenshot image and displays the thumbnail of the screenshot image;

a searching module, configured to search a fourth screenshot folder corresponding to the target image type based on a pre-set correspondence between the image type and the screenshot folder;

a second processing module, configured to store the screenshot image to a fourth screenshot folder, control the storage module and store the screenshot image to the target storage location in response to the second input.

Where the first processing module is further configured to:

display a sharing icon while generating the screenshot image and displaying the thumbnail of the screenshot image;

The terminal device further includes:

a sharing module, configured to receive a third input performed by the user for the sharing icon, and share the screenshot image to a target object in response to the third input.

The terminal device provided by the embodiments of the present disclosure generates the screenshot image and displays the thumbnail of the screenshot image in response to the first input performed by the user; receives the second input performed by the user for the thumbnail and determines the target storage location; and stores the screenshot image based on the determined target storage location. The quick sorting and storing function for the screenshot image may be achieved, to ensure that the screenshot image is orderly stored based on the operation performed by the user, the efficiency of arranging the screenshot image is improved, the cost of arranging is saved, and meanwhile, a variety of storage methods may be provided to the screenshot image.

Optionally, the automatic storage of the screenshot image may be achieved through turning on the automatic storage function, the sharing of the screenshot image may be achieved through generating the sharing icon while displaying the thumbnail, and the using experience of the user is improved.

Figure 7:
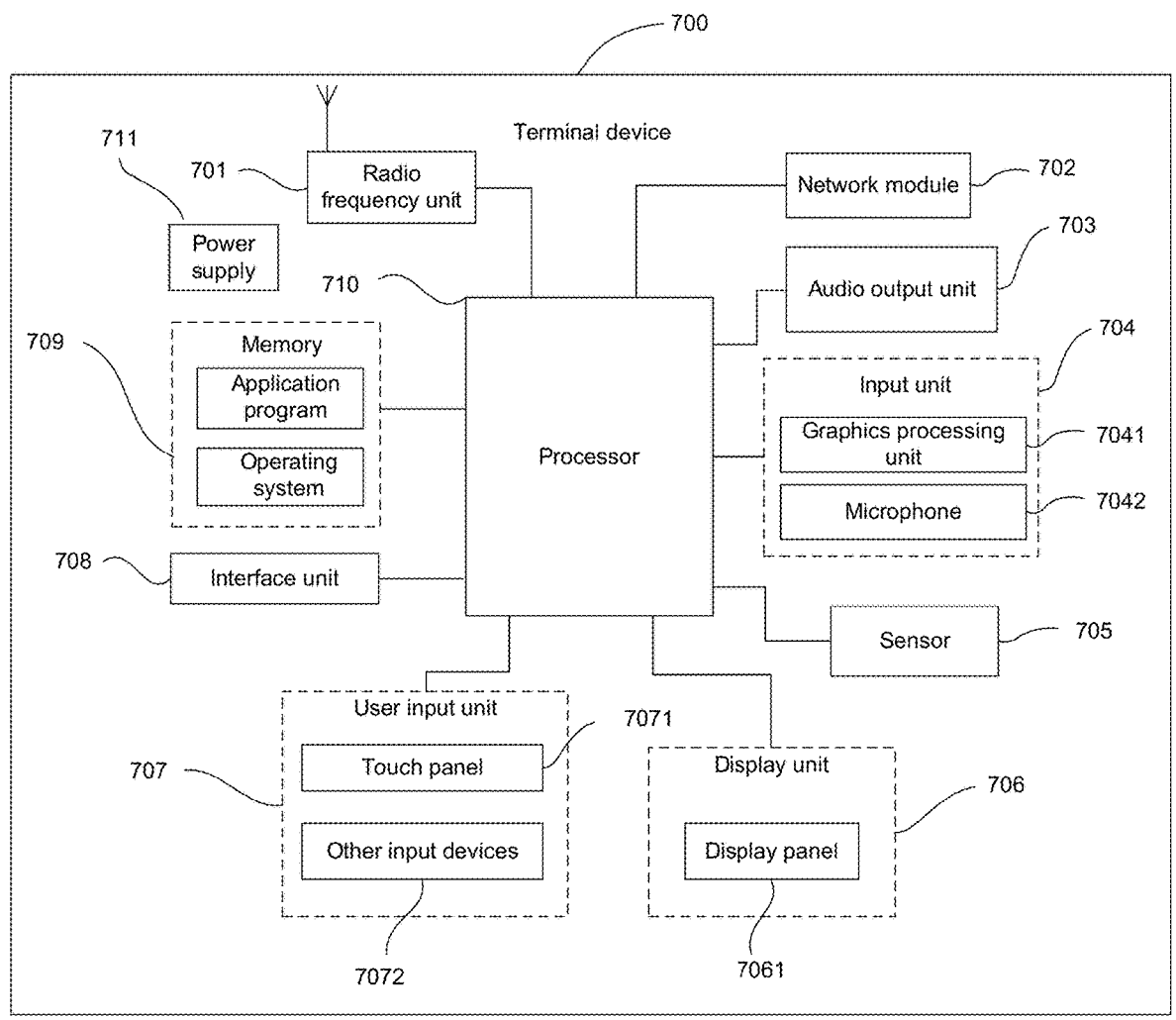
FIG. 7 is a schematic diagram of a hardware structure of a terminal device according to an embodiment of the present disclosure.

FIG. 7 is a schematic diagram of a hardware structure of a terminal device implementing the various embodiments of the present disclosure. The terminal device 700 includes, but not limited to: a radio frequency unit 701, a network module 702, an audio output unit 703, an input unit 704, a sensor 705, a display unit 706, a user input unit 707, an interface unit 708, a memory 709, a processor 710, a power supply 711, and the like.

A person skilled in the art may understand that the structure of the terminal device shown in FIG. 7 does not constitute a limitation to the terminal device. The terminal device may include more or fewer components than that shown in the figure, or a combination of some components, or an arrangement of different components. In this embodiment of the present disclosure, the terminal device includes but is not limited to a mobile phone, a tablet computer, a notebook computer, a palmtop computer, a vehicle-mounted terminal, a wearable device, a pedometer, or the like.

Where the user input unit 707 is configured to receive a first input; the processor 710 is configured to generate a screenshot image and display a thumbnail of the screenshot image in response to the first input; and the user input unit 707 is further configured to:

receive a second input for the thumbnail; the processor 710 is further configured to determine a target storage location in response to the second input; and store the screenshot image to a target storage location.

Where the second input is a first sliding operation in a first direction; in response to the second input, while determining the target storage location, the processor 710 is further configured to control the display unit 706 to display at least one screenshot folder or screenshot folder icon in response to the first sliding operation; the user input unit 707 is further configured to receive the first touch operation performed by the user for a first screenshot folder or a first screenshot folder icon; and the processor 710 is further configured to determine the first screenshot folder as the target storage location of the screenshot image in response to the first touch operation.

Where the second input is a second sliding operation in a second direction; in response to the second input, while determining the target storage location, the processor 710 is further configured to control the display unit 706 to display at least one screenshot folder or screenshot folder icon during a process of receiving the second sliding operation; and the processor 710 is further configured to determine the second screenshot folder as the target storage location of the screenshot image while the second sliding operation stops on a second screenshot folder or a second screenshot folder icon.

Where the second input is a third sliding operation in a third direction; in response to the second input, while determining the target storage location, the processor 710 is further configured to control the display unit 706 to display at least one screenshot type icon during a process of receiving the third sliding operation; and the processor 710 is further configured to determine a third screenshot folder corresponding to a first screenshot type icon and determine the third screenshot folder as the target storage location of the screenshot image while the third sliding operation stops on the first screenshot type icon.

Where after generating the screenshot image and displaying the thumbnail of the screenshot image, the processor 710 is further configured to:

identify a target image type corresponding to the thumbnail; search a fourth screenshot folder corresponding to the target image type based on a pre-set correspondence between an image type and the screenshot folder; and store the screenshot image to the fourth screenshot folder, and store the screenshot image to the target storage location in response to the second input.

Where while the processor 710 generates the screenshot image and displays the thumbnail of the screenshot image, the display unit 706 is configured to display a sharing icon; the user input unit 707 is further configured to receive a third input performed by the user for the sharing icon; and the processor 710 is configured to share the screenshot image to a target object in response to the third input.

In this way, the screenshot image is generated through the first input performed by the user and the thumbnail of the screenshot image is displayed; the second input performed by the user for the thumbnail is received and the target storage location is determined; and the screenshot image is stored based on the determined target storage location. The quick sorting and storing function for the screenshot image may be achieved, to ensure that the screenshot image is orderly stored based on the operation performed by the user, the efficiency of arranging the screenshot image is improved, the cost of arranging is saved, and meanwhile, a variety of storage methods may be provided to the screenshot image.

Optionally, the automatic storage of the screenshot image may be achieved through turning on the automatic storage function, the sharing of the screenshot image may be achieved through generating the sharing icon while displaying the thumbnail, and the using experience of the user is improved.

It should be understood that, in this embodiment, the radio frequency unit 701 may be configured to receive and send a signal during a process of sending and receiving a message or a conversation. For example, after downlink data from a base station is received, the downlink data is processed by the processor 710. In addition, uplink data is sent to the base station. Generally, the radio frequency unit 701 includes but is not limited to an antenna, at least one amplifier, a transceiver, a coupler, a low noise amplifier, a duplexer, and the like. In addition, the radio frequency unit 701 further may communicate with other devices through a wireless communication system and a network.

The terminal device provides a user with wireless broadband Internet access through the network module 702, for example, helps the user send and receive emails, browse web pages, and access streaming media.

The audio output unit 703 may convert audio data received through the radio frequency unit 701 or the network module 702 or stored in the memory 709 into an audio signal and output the audio signal as a sound. Moreover, the audio output unit 703 may also provide an audio output (such as a receiving sound of a calling signal, a message receiving sound and the like) related to a specific function executed by the terminal device 700. The audio output unit 703 includes a speaker, a buzzer, a telephone receiver, and the like.

The input unit 704 is configured to receive an audio signal or a video signal. The input unit 704 may include a graphics processing unit (GPU) 7041 and a microphone 7042. The graphics processing unit 7041 is configured to process image data of a static picture or a video obtained by an image capture apparatus (for example, a camera) in a video capture mode or an image capture mode. A processed image frame may be displayed on the display unit 706. The image frame processed by the graphics processing unit 7041 may be stored in the memory 709 (or other storage media) or sent by the radio frequency unit 701 or the network module 702. The microphone 7042 may receive a sound and can process such sound into audio data. The processed audio data may be converted into a format output which is sent to a mobile communication base station by the radio frequency unit 701 under a telephone conversation mode.

The terminal device 700 further includes at least one sensor 705, such as a light sensor, a motion sensor and other sensors. For example, the light sensor includes an ambient light sensor and a proximity sensor. The ambient light sensor may adjust luminance of a display panel 7061 based on brightness of ambient light. The proximity sensor may turn off the display panel 7061 and/or backlight while the terminal device 700 approaches an ear. As a type of the motion sensor, an accelerometer sensor may detect an acceleration in each direction (generally, three axes), and detect a value and a direction of gravity while the accelerometer sensor is static, and may be configured to identify a posture of the terminal device (such as screen switching between landscape and portrait modes, a related game, or magnetometer posture calibration), a function related to vibration identification (such as a pedometer or a knock), and the like. The sensor 705 may further include a fingerprint sensor, a pressure sensor, an iris sensor, a molecular sensor, a gyroscope, a barometer, a hygrometer, a thermometer, and an infrared sensor. Details are not described herein.

The display unit 706 is configured to display information input by a user or information provided to a user. The display unit 706 may include the display panel 7061, which can be configured in forms of a liquid crystal display (LCD), an organic light-emitting diode (OLED) and the like.

The user input unit 707 may be configured to receive input figures or character information and generate a key signal input related to user setting and function control of the terminal device. For example, the user input unit 707 includes a touch panel 7071 and another input device 7072. A touch panel 7071 is also known as a touch screen, which may collect a touch operation of a user on or around the touch panel (for example, the user executes the operation on or around the touch panel 7071 by using a finger, a touch pen and other suitable objects or accessories). The touch panel 7071 may include two parts: a touch detection apparatus and a touch controller. Where the touch detection apparatus is configured to detect a touch direction of the user, detect a signal brought by the touch operation, and send the signal to the touch controller. The touch controller receives touch information from the touch detection apparatus, converts the touch information into a contact coordinate, and then sends the contact coordinate to the processor 710. The touch controller also receives a command sent from the processor 710 and executes the command In addition, the touch panel 7071 may be achieved by a variety of types, such as a resistance type, a capacitance type, an infrared ray and a surface acoustic wave. In addition to the touch panel 7071, the user input unit 707 may further include other input devices 7072. For example, other input devices 7072 may include, but be not limited to a physical keyboard, a function key (such as a volume control key, a switch key), a trackball, a mouse and a joystick. Details are not described herein.

For example, the touch panel 7071 may be covered on the display panel 7061. While the touch panel 7071 detects the touch operation on or around thereof, the touch panel 7071 sends the touch operation to the processor 710 to determine a type of a touch event, and then the processor 710 provides a corresponding visual output on the display panel 7061 based on the type of the touch event. Although in FIG. 7, the touch panel 7071 and the display panel 7061 are configured as two independent components to implement input and output functions of the terminal device, in some embodiments, the touch panel 7071 and the display panel 7061 can be integrated to implement the input and output functions of the terminal device. Details are not limited herein.

The interface unit 708 is an interface for connecting an external apparatus to the terminal device 700. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 708 may be configured to receive an input (for example, data information or power) from the external apparatus and transmit the received input to one or more elements in the terminal device 700, or transmit data between the terminal device 700 and the external apparatus.

The memory 709 may be configured to store a software program and various data. The memory 709 may mainly include a stored program region and a stored data region, where the stored program region may store an application program (such as a sound playing function and an image playing function) required by an operation system and at least one function. The stored data region may store data (such as audio data, a telephone book) created based on the use of a mobile phone. In addition, the memory 709 may include a high-speed random access memory, further include a nonvolatile memory, for example, at least one disk storage device, a flash memory or other volatile solid storage devices.

The processor 710 is a control center of the terminal device, and various parts of whole terminal device are connected through various interfaces and circuits. Various functions and processing data of the terminal device are executed by running or executing a software program and/or a module stored in the memory 709 and calling data stored in the memory 709 so as to perform overall monitoring on the terminal device. The processor 710 may include one or more processing units. Optionally, an application processor and a modem processor may be integrated into the processor 710. The application processor mainly processes an operating system, a user interface, an application program, and the like. The modem processor mainly processes wireless communications. It should be understood that the modem processor may be not integrated in the processor 710.

The terminal device 700 may further include the power supply 711 (such as a battery) that supplies power to each component. Optionally, the power supply 711 may be logically connected to the processor 710 by using a power management system, to implement functions such as charging, discharging, and power consumption management by using the power management system.

In addition, the terminal device 700 includes some functional modules that are not shown. Details are not described herein.

Optionally, embodiments of the present disclosure further provide a terminal device, including a processor 710, a memory 709 and a computer program that is stored in the memory 709 and may be executable on the processor 710. When the computer program is executed by the processor 710, each progress of the embodiments of the above image storage method is implemented, and the same technical effect can be achieved. In order to avoid repetition, details are not described herein.

The embodiments of the present disclosure further provide a non-transitory computer-readable storage medium, where the non-transitory computer-readable storage medium stores a computer program, and when the computer program is executed by the processor, each progress of the embodiments of the above image storage method is implemented, and the same technical effect can be achieved. In order to avoid repetition, details are not described herein. Where the non-transitory computer-readable storage medium may be a read-only memory (ROM), a random access memory (RAM), a magnetic disk, or a compact disc and the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a . . . " does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of the present disclosure essentially or the part contributing to the prior art may be implemented in a form of a software product. The computer software product is stored in a storage medium (such as a ROM/RAM, a magnetic disk, or a compact disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. An image storage method, comprising:
   receiving a first input;
   generating a screenshot image and displaying a thumbnail of the screenshot image in response to the first input;
   receiving a second input for the thumbnail;
   determining a target storage location in response to the second input; and
   storing the screenshot image to the target storage location; wherein
   in response to the second input comprising at least two of: a first sliding operation in a first direction, a second sliding operation in a second direction, and a third sliding operation in a third direction, at least two screenshot folders are determined according to the operation performed by a user, the at least two screenshot folders being determined as target storage locations of the screenshot images, wherein the determined target storage locations are different due to different second inputs.

2. The image storage method according to claim 1, wherein the second input is the first sliding operation in the first direction;
   the determining the target storage location in response to the second input comprises:
   displaying at least one screenshot folder or screenshot folder icon in response to the first sliding operation;
   receiving a first touch operation performed by the user for a first screenshot folder or a first screenshot folder icon; and
   determining the first screenshot folder as the target storage location of the screenshot image in response to the first touch operation.

3. The image storage method according to claim 1, wherein the second input is the second sliding operation in the second direction;
   the determining the target storage location in response to the second input comprises:
   displaying at least one screenshot folder or screenshot folder icon during a process of receiving the second sliding operation; and
   determining a second screenshot folder as the target storage location of the screenshot image while the second sliding operation stops on the second screenshot folder or a second screenshot folder icon.

4. The image storage method according to claim 1, wherein the second input is the third sliding operation in the third direction;
   the determining the target storage location in response to the second input comprises:
   displaying at least one screenshot type icon during a process of receiving the third sliding operation; and
   determining a third screenshot folder corresponding to a first screenshot type icon and determining the third screenshot folder as the target storage location of the screenshot image while the third sliding operation stops on the first screenshot type icon.

5. The image storage method according to claim 1, wherein after the generating the screenshot image and displaying the thumbnail of the screenshot image, the method further comprising:
   identifying a target image type corresponding to the thumbnail;
   searching a fourth screenshot folder corresponding to the target image type according to a per-set correspondence between an image type and the screenshot folder; and
   storing the screenshot image to the fourth screenshot folder, and storing the screenshot image to the target storage location in response to the second input.

6. The image storage method according to claim 1, wherein the generating the screenshot image and displaying the thumbnail of the screenshot image comprises:
   displaying a sharing icon while generating the screenshot image and displaying the thumbnail of the screenshot image; and the method further comprising:
receiving a third input performed by a user for the sharing icon, and sharing the screenshot image to a target object in response to the third input.

7. A terminal device, comprising a processor, a memory and a computer program that is stored on the memory and executable on the processor, and the computer program, when executed by the processor, causes the terminal device to perform:
receiving a first input;
generating a screenshot image and displaying a thumbnail of the screenshot image in response to the first input;
receiving a second input for the thumbnail;
determining a target storage location in response to the second input; and
storing the screenshot image to the target storage location; wherein
in response to the second input comprising at least two of: a first sliding operation in a first direction, a second sliding operation in a second direction, and a third sliding operation in a third direction, at least two screenshot folders are determined according to the operation performed by a user, the at least two screenshot folders being determined as target storage locations of the screenshot images, wherein the determined target storage locations are different due to different second inputs.

8. The terminal device according to claim 7, wherein the second input is the first sliding operation in the first direction;
the computer program, when executed by the processor, causes the terminal device to perform:
displaying at least one screenshot folder or screenshot folder icon in response to the first sliding operation;
receiving a first touch operation performed by a user for a first screenshot folder or a first screenshot folder icon; and
determining the first screenshot folder as the target storage location of the screenshot image in response to the first touch operation.

9. The terminal device according to claim 7, wherein the second input is the second sliding operation in the second direction;
the computer program, when executed by the processor, causes the terminal device to perform:
displaying at least one screenshot folder or screenshot folder icon during a process of receiving the second sliding operation; and
determining a second screenshot folder as the target storage location of the screenshot image while the second sliding operation stops on the second screenshot folder or a second screenshot folder icon.

10. The terminal device according to claim 7, wherein the second input is the third sliding operation in the third direction;
the computer program, when executed by the processor, causes the terminal device to perform:
displaying at least one screenshot type icon during a process of receiving the third sliding operation; and
determining a third screenshot folder corresponding to a first screenshot type icon and determining the third screenshot folder as the target storage location of the screenshot image while the third sliding operation stops on the first screenshot type icon.

11. The terminal device according to claim 7, wherein the computer program, when executed by the processor, causes the terminal device to further perform:
identifying a target image type corresponding to the thumbnail;
searching a fourth screenshot folder corresponding to the target image type according to a per-set correspondence between an image type and the screenshot folder; and
storing the screenshot image to the fourth screenshot folder, and storing the screenshot image to the target storage location in response to the second input.

12. The terminal device according to claim 7, wherein the computer program, when executed by the processor, causes the terminal device to perform:
displaying a sharing icon while generating the screenshot image and displaying the thumbnail of the screenshot image; and
the computer program, when executed by the processor, causes the terminal device to further perform:
receiving a third input performed by a user for the sharing icon, and sharing the screenshot image to a target object in response to the third input.

13. A non-transitory computer-readable storage medium, wherein the non-transitory computer-readable storage medium stores a computer program, and the computer program, when executed by a processor, causes the processor to perform:
receiving a first input;
generating a screenshot image and displaying a thumbnail of the screenshot image in response to the first input;
receiving a second input for the thumbnail;
determining a target storage location in response to the second input; and
storing the screenshot image to the target storage location; wherein
in response to the second input comprising at least two of: a first sliding operation in a first direction, a second sliding operation in a second direction, and a third sliding operation in a third direction, at least two screenshot folders are determined according to the operation performed by a user, the at least two screenshot folders being determined as target storage locations of the screenshot images, wherein the determined target storage locations are different due to different second inputs.

14. The non-transitory computer-readable storage medium according to claim 13, wherein the second input is the first sliding operation in the first direction;
the computer program, when executed by the processor, causes the processor to perform:
displaying at least one screenshot folder or screenshot folder icon in response to the first sliding operation;
receiving a first touch operation performed by a user for a first screenshot folder or a first screenshot folder icon; and
determining the first screenshot folder as the target storage location of the screenshot image in response to the first touch operation.

15. The non-transitory computer-readable storage medium according to claim 13, wherein the second input is the second sliding operation in the second direction;
the computer program, when executed by the processor, causes the processor to perform:
displaying at least one screenshot folder or screenshot folder icon during a process of receiving the second sliding operation; and
determining a second screenshot folder as the target storage location of the screenshot image while the second sliding operation stops on the second screenshot folder or a second screenshot folder icon.

16. The non-transitory computer-readable storage medium according to claim 13, wherein the second input is the third sliding operation in the third direction;

the computer program, when executed by the processor, causes the processor to perform:

displaying at least one screenshot type icon during a process of receiving the third sliding operation; and determining a third screenshot folder corresponding to a first screenshot type icon and determining the third screenshot folder as the target storage location of the screenshot image while the third sliding operation stops on the first screenshot type icon.

17. The non-transitory computer-readable storage medium according to claim 13, wherein the computer program, when executed by the processor, causes the processor to further perform:

identifying a target image type corresponding to the thumbnail;

searching a fourth screenshot folder corresponding to the target image type according to a per-set correspondence between an image type and the screenshot folder; and storing the screenshot image to the fourth screenshot folder, and storing the screenshot image to the target storage location in response to the second input.

18. The non-transitory computer-readable storage medium according to claim 13, wherein the computer program, when executed by the processor, causes the processor to perform:

displaying a sharing icon while generating the screenshot image and displaying the thumbnail of the screenshot image; and the computer program, when executed by the processor, causes the processor to further perform:

receiving a third input performed by a user for the sharing icon, and sharing the screenshot image to a target object in response to the third input.

* * * * *